July 9, 1963  J. E. GARRETT ETAL  3,096,609
HAY RAKE TOOTH
Filed Dec. 14, 1961

INVENTOR.
JOHN E. GARRETT
BY KENNETH W. HOWICK

*J. B. Holden*
ATTORNEY

United States Patent Office 3,096,609
Patented July 9, 1963

3,096,609
HAY RAKE TOOTH
John E. Garrett and Kenneth W. Howick, St. Marys, Ohio, assignors to The Goodyear Tire & Rubber Company, Akron, Ohio, a corporation of Ohio
Filed Dec. 14, 1961, Ser. No. 159,263
4 Claims. (Cl. 56—400)

This invention relates to a hay rake and more particularly to a hay rake tooth construction.

Recently considerable effort has been directed to a hay rake tooth construction in which the tine is resiliently attached to the mounting clip by an elastomeric material such as rubber. In many of the previous constructions, the resilience of the tooth was provided by a coil spring portion attached to the rake bar of the hay rake with the tooth itself depending from the coil spring as an extension thereof. A much improved tooth construction includes a rigid clip attached directly to the rake bar and the tine resiliently mounted on the clip by means of an elastomeric material such as rubber. The tooth breakage and tine distortion has been materially reduced by the use of a rubber mounting but in certain instances, severe bending of the tines was encountered due to substantial rigidity in certain portions of the rubber mounting. Thus, the tooth itself bends under certain conditions rather than the rubber permitting the tine to deflect.

It is therefore, an object of this invention to provide a new and novel hay rake tooth construction.

A further object of the invention is to provide a tooth mounting construction which not only minimizes tooth breakage but also materially reduces tine bending.

A still further object of the invention is to provide a construction of a hay rake tooth which is easily attached or removed from the rake bar of the machine.

A still further object of the invention is to provide a hay rake tooth construction which has sufficient lateral stability to provide for good raking and at the same time sufficient flexibility to overcome many of the bending forces encountered in normal operation of the machine.

These and other objects and advantages of this invention will become apparent hereinafter as the description thereof proceeds, the novel features, arrangements and combinations being clearly pointed out in the specification as well as the claims thereunto appended.

Figure 1:
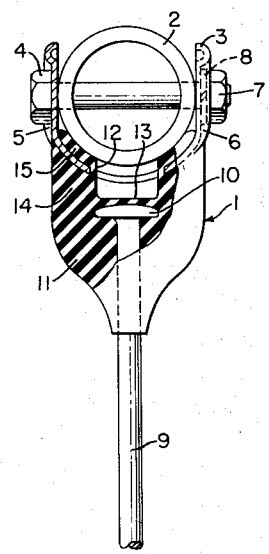
FIG. 1 is a view of a typical tooth of the invention in position on the rake bar with parts broken away and shown in section.
Figure 2:
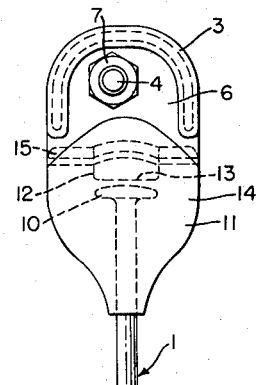
FIG. 2 is a side elevation of the invention.
Figure 3:
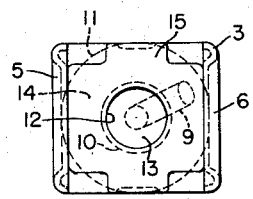
FIG. 3 is a plan view of the invention.

As best seen in FIG. 1 a hay rake tooth 1 is attached to the rake bar 2 by means of a generally U-shaped clip 3 engaging the sides of rake bar 2. A bolt 4 passes through mating apertures in the sides 5 and 6 of clip 3 and the rake bar 2 and is secured in position with the nut 7 and lock washer 8. The position of the apertures in the rake bar control the direction of extension of the tine 9 of the tooth 1 with respect to the bar. The particular configuration of clip 3 and the means of attaching it to the rake bar 2 are representative but it is to be understood that these may be modified to the particular desired construction.

The tine 9 as shown has an upset head portion 10 along with the adjacent portion of tine 9 embedded in the block 11 of elastomeric material such as rubber either synthetic or natural. Block 11 is adhered to the metal clip 3 and extends for substantially the entire width thereof. Preferably block 11 is of a symmetrical cross section and reduces in size in the end portion away from clip 3 to provide proper flexibility. Block 11 extends substantially normal to the length of the rake bar 2 and tine 9 preferably is centered in the block 11 of elastomeric material. A recess 12 is formed in the upper portion of the elastomeric material immediately over head 10 of tine 9 and as shown, is of substantially the same size as head 10. The bottom 13 of recess 12 is close to head 10 to provide sufficient flexibility in the portion of rubber block 11 immediately above head 10. By forming recess 12 as shown the wall portion 14 of block 11 introduces considerable flexibility in block 11 immediately above and surrounding head 10. This flexibility not only permits a much greater lateral deflectibility of the tooth without bending if a solid object is encountered during the raking operation but allows axial deflection of the tooth to reduce bending if such flexibility was not provided.

Many modifications of the configuration of the clip and block 11 can be made without departing from the principle of the invention. As shown, a layer 15 of rubber lies between clip 3 and rake bar 2 for additional cushioning but is not necessary to this invention. The particular configuration and size of the recess 12 may be varied considerably but the surrounding wall structure 14 must have sufficient resilience to maintain the tooth in the proper position during the normal raking operation, but at the same time provide for lateral and axial deflection of the tine in the event that a solid object is encountered during the raking operation.

While certain representative embodiments and details have been shown for the purpose of illustrating the invention, it will be apparent to those skilled in the art that various changes and modifications may be made therein without departing from the spirit or scope of the invention.

Having thus fully described our invention, what we claim and desire to secure by Letters Patent of the United States is:

1. A hay rake tooth for mounting on a rake bar comprising a clip element for attaching said tooth to said rake bar, a block of elastomeric material having one end firmly attached to and depending from said clip element, a rake tooth extending from the end of said block away from said rake bar in a direction substantially normal to said rake bar, a portion of said tooth being firmly embedded in and adhered to elastomeric material of said block, a recess in said block of elastomeric material on the end adjacent said clip and extending toward the opposite end stopping short of the end of the embedded portion of said rake tooth, and an aperture in said clip coextensive with said recess.

2. A hay rake tooth for mounting on a rake bar comprising a clip element for attaching said tooth to said rake bar, a block of elastomeric material having one end firmly attached to and depending from said clip element, a rake tooth extending from the opposite end of said block away from said rake bar in a direction substantially normal to said rake bar, a portion of said tooth being firmly embedded in and adhered to elastomeric material of said block, a recess extending from the rake bar side of said clip into said block of elastomeric material toward the embedded portion of the rake tooth with the bottom of said recess being spaced from the end thereof to provide greater flexibility in the portion of the elastomeric block adjacent the rake bar.

3. In a hay rake tooth which is attached to a rake bar of a hay rake machine by means of a clip, an improved means of attaching the tooth to said clip comprising an elongated block of elastomeric material having one end attached to said clip and the tooth depending from the opposite end thereof with a portion of said tooth being embedded in the block of elastomeric material, a recess centrally positioned in the clip end of said block extending axially thereof terminating in spaced relation to the end of the embedded portion of said tooth embedded in said block, and an aperture in said clip substantially coextensive with said recess.

4. A hay rake tooth as claimed in claim 3 in which said recess and tooth are in substantial alignment and centrally positioned in said elastomeric block.

References Cited in the file of this patent
UNITED STATES PATENTS

| | | |
|---|---|---|
| 2,909,889 | Gustafson | Oct. 27, 1959 |
| 2,957,299 | Gustafson et al. | Oct. 25, 1960 |